United States Patent [19]

Mesfin et al.

[11] Patent Number: 5,561,589
[45] Date of Patent: *Oct. 1, 1996

[54] EXPANSION BASE AND SYSTEM FOR PORTABLE COMPUTERS

[75] Inventors: Teodros Mesfin; Jon Kolas, both of Houston; John E. Youens, Spring, all of Tex.

[73] Assignee: Compaq Computer Corporation, Houston, Tex.

[*] Notice: The term of this patent shall not extend beyond the expiration date of Pat. No. 5,384,686.

[21] Appl. No.: 296,737

[22] Filed: Aug. 26, 1994

Related U.S. Application Data

[63] Continuation of Ser. No. 774,203, Oct. 10, 1991, Pat. No. 5,384,686, which is a continuation-in-part of Ser. No. 597,769, Oct. 15, 1990, Pat. No. Des. 335,490.

[51] Int. Cl.⁶ .............................. G06F 1/16; H05K 7/10; H01R 13/629
[52] U.S. Cl. ........................ 361/686; 439/159; 439/377
[58] Field of Search ...................... 364/708.1; 312/223.1, 312/223.2, 257.1, 263; 439/152, 153, 155, 159, 160, 347, 374, 377, 378; 248/917–923; 361/679–687, 724–727, 740, 741, 754, 756, 757, 759

[56] References Cited

U.S. PATENT DOCUMENTS

| 4,128,288 | 12/1978 | Zachry et al. | 439/152 |
| 4,769,764 | 9/1988 | Levanon | 364/208.1 X |
| 5,030,128 | 7/1991 | Herron et al. | 361/683 X |
| 5,384,686 | 1/1995 | Mesfin et al. | 361/686 |

Primary Examiner—Michael W. Phillips
Attorney, Agent, or Firm—Synnestvedt & Lechner

[57] ABSTRACT

A base cabinet system is provided for a laptop computer, on which the laptop can be placed for expanded home-based use. A reinforced removable cover arches over the top of the base cabinet so that the laptop can be slid into position on top of the base cabinet and beneath the cover, and the monitor rested on the top of the cover; when one wishes to use the laptop display, the monitor and cover are easily removed to permit tilt-up of the laptop display. Special retainers are provided to assure that the cover seats itself and remains in its proper installed position, and special guides are provided to assure that when the laptop is slid into position the connector on its rear side will mate properly with the corresponding connector on the base cabinet. A leveraged actuator system is provided so that an operator, by exerting a modest force on a manual actuator at the front of the system, can apply a multiplied force between base cabinet and laptop computer to disengage the laptop connector from the base cabinet connector.

13 Claims, 8 Drawing Sheets

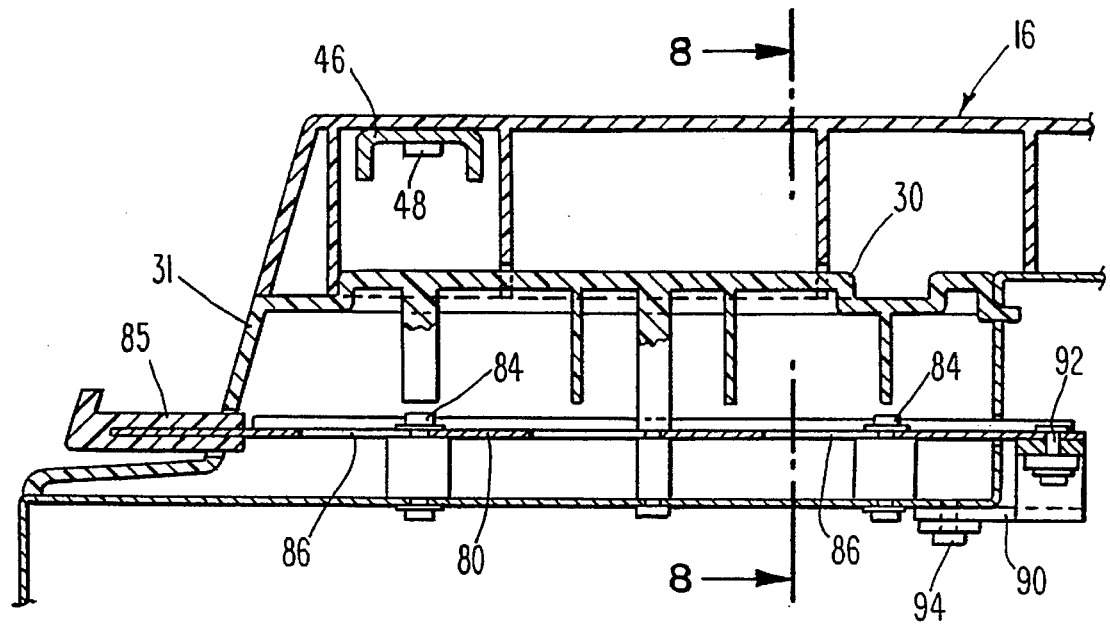
Fig. 7
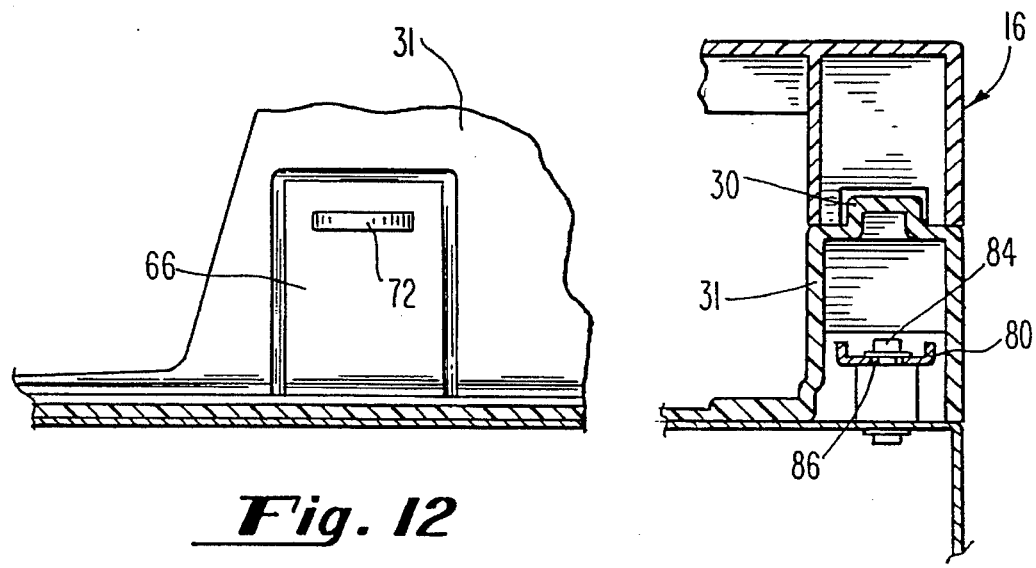
Fig. 12
Fig. 8

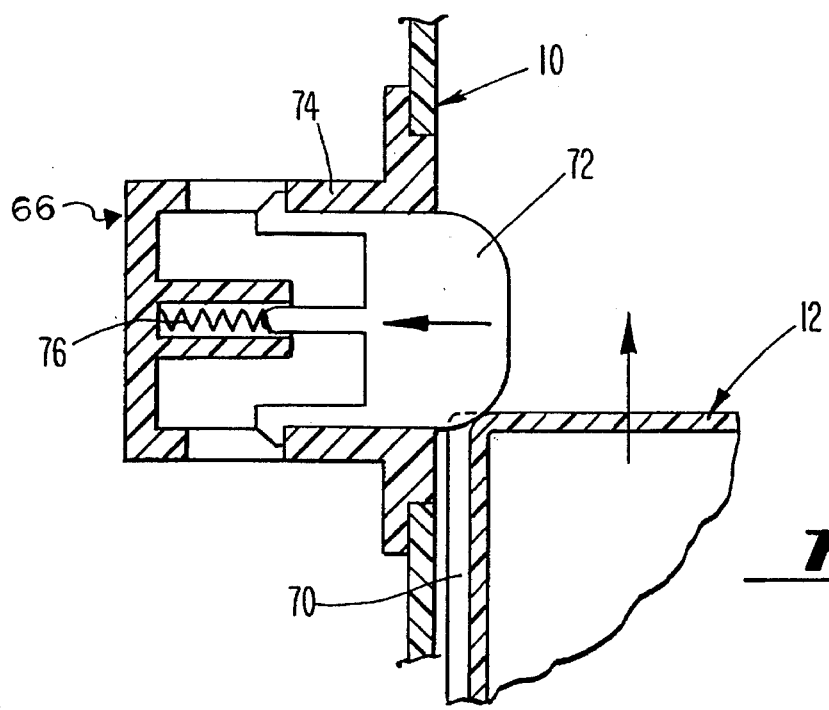
_Fig. 13_
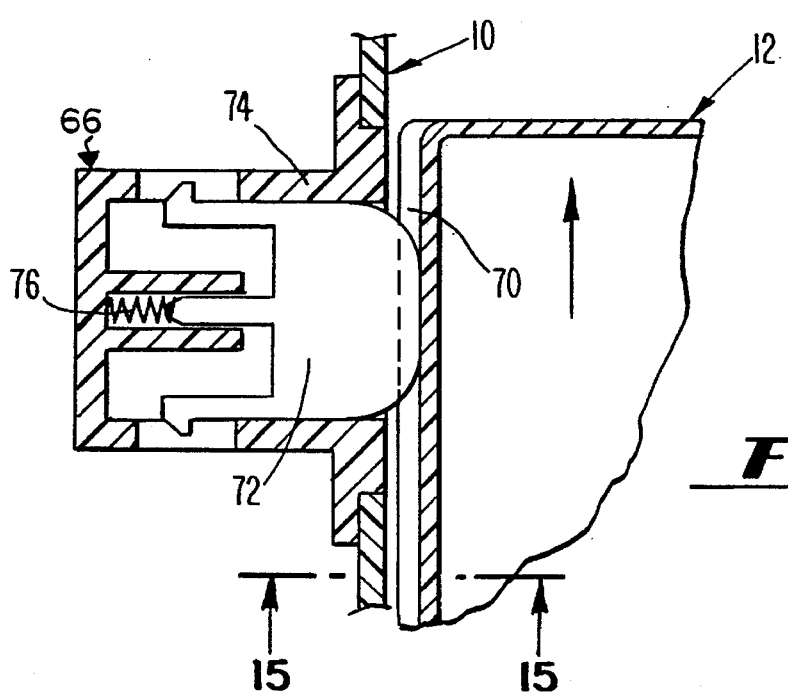
_Fig. 14_
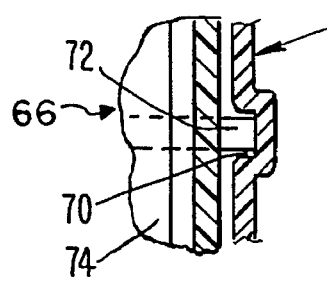
_Fig. 15_

EXPANSION BASE AND SYSTEM FOR PORTABLE COMPUTERS

CROSS REFERENCE TO RELATED APPLICATION

This is a Continuation application of application Ser. No. 07/774,203, filed Oct. 10, 1991, now U.S. Pat. No. 5,384,686 which is a continuation-in-part of Design application Ser. No. 07/597,769, filed on Oct. 15, 1990, now U.S. Pat. No. Des. 335,490.

FIELD OF THE INVENTION

This invention relates to an expansion base and expansion-base system for a portable computer, and particularly to a desk top expansion base for a notebook type of laptop personal computer.

BACKGROUND OF THE INVENTION

Portable computers are now well known, of which the so-called "laptop" computer is an example. The laptop computer generally has a substantially parallelopiped outer form, with a tilt-up display screen, and is of a weight and size making it very easy to carry and use on one's lap. A small version of the portable computer is commonly designated as a "notebook" personal computer, typically weighing about six pounds. Such portable computers, while being very effective for specific purposes, are generally somewhat limited in the computer capabilities which they can provide, particularly because of their small size, and because of their relatively low permissible power drain, in view of the fact that they must be battery operated.

To retain the useful physical size characteristics of a small portable computer while it is being used as such, while expanding its capabilities when it is at a home base, it is known to provide an expansion base on which the portable computer can be placed and to which it can be electrically interconnected. The expansion base typically contains suitable power supply electronics for supplying power to the adjacent portable computer and also carries electronic equipment such as additional memory, provision for additional optional cards, modem equipment, etc. to expand the computer capabilities of the portable. To permit this electronic expansion, typically the portable is provided at its rear vertical surface with a multi-pin connector, and a mating connector is provided on the expansion base so that the two connectors can be mated by sliding the laptop horizontally toward the expansion base connector until the two connectors mate.

Some drawbacks exists with such known forms of systems. First, the external monitor which is connected to the portable computer when in use on the expansion base has typically been placed beside the laptop computer, or on a special shelf or suspension system nearby. In general, it could not be placed upon the top of the laptop because the relatively great weight of a typical monitor cannot safely be supported on the relatively flimsy end fragile top of the closed portable computer.

Furthermore, it is relatively difficult to remove the laptop computer from its position on the usual expansion base because of the substantial forces required to disconnect the multi-contact connector interconnecting the portable computer and the expansion base. This connector may typically have up to nearly two hundred pins and corresponding sockets, and a separating force of as much as about twenty-five pounds may be required. While it is feasible to place a handle on the laptop computer to aid one in forcing the laptop to disconnect from the expansion base, this procedure is rather awkward and requires application of substantial force.

Another typical drawback of such assemblies is that it is often somewhat difficult to provide the alignment necessary to slide the portable onto the expansion base so accurately that the pins and sockets of the respective connectors mate exactly, and do not become misaligned by a small amount which may nevertheless cause damage to the connector system and make assembly difficult.

A further drawback is that if the portable computer is merely placed on top of the expansion base and the two connectors mated, there is opportunity during the assembly or disassembly process of placing further undesirable strains on the connectors due to misalignment or cocking of the portable computer sideways, or even tilting upwardly during assembly or disassembly. Either of these occurrences may make assembling the laptop on the base more difficult, or result in some damage, such as bending of the connector pins.

A typical desktop expansion base of the prior art is that designated for use with the Compaq Model LTE 286/20, sold by Compaq Computer Corporation of Houston, Tex., which provides for the support of a laptop computer on an expansion base by sliding the laptop horizontally along the top of the expansion base until the multi-connector plug of the laptop mates with the multi-connector plug of the expansion base, the expansion base then providing a variety of desirable auxiliary electronic functions for use in connection with, and as an extension of, the laptop computer. However, this latter system has no provision for support of an external monitor, requires substantial force to disassemble the laptop connector from the expansion base connector, and can present some difficulty in assuring that the laptop moves or slides exactly horizontally and normally to the expansion base connector during assembly so that the pins and sockets of the two connectors mate easily and precisely.

It is therefore an object of the present invention to provide a new and useful expansion base and expansion base system for receiving a portable computer on the top of an expansion base and connecting them together electrically so as to provide auxiliary electrical functions for the portable computer so long as it remains in its position on the expansion base.

It is also an object to provide such an expansion base and system which provide for support of an external monitor in a manner to conserve space in the work area.

Another object is to provide such a system in which the force which the operator must apply to disengage the connectors of the expansion base and of the portable computer from each other is greatly reduced.

Still another object is to provide such a system in which the portable computer is accurately guided while it is being slid into position, so that precise, proper mating of the connector of the portable computer and the connector of the expansion base is automatically accomplished.

BRIEF SUMMARY OF THE INVENTION

These and other objects and features of the invention are realized by the provision of an expansion system for a portable computer which uses an expansion base comprising an expansion base cabinet for receiving a portable computer on its top and containing auxiliary electrical apparatus for use in connection with the portable computer resting upon it. The monitor-support structure is itself supported on the expansion base, and extends over the top of the portable computer when in place to provide a top platform upon which the external monitor may be rested safely. To provide the requisite strength, this monitor support structure is preferably made of metal-reinforced plastic material, and is keyed to the portion of the base cabinet upon which its rests so as to prevent its dislodgement by horizontal motion.

The front of the cover, or monitor-support structure, is preferably open, so that the portable computer can be slid into position on top of the expansion base without removal of the monitor support structure. However, the monitor-support structure is preferably easily removable by upward motion, so that one can easily removes it and tilt up the screen of the portable computer for use as the display device.

Preferably also, the expansion base is provided with a remotely actuatable pusher connected to a remote actuator on the expansion base cabinet which, when actuated, causes the pusher to apply a separating force between portable computer and the expansion cabinet, to cause separation of the connector on the portable computer from the connector on the expansion base. Preferably a substantial mechanical advantage is provided between the force necessary to operate the actuator for this purpose and the separating force thereby delivered between the portable computer and expansion base, to greatly reducing the amount of operator force required to accomplish the desired separation.

Preferably, a linkage between the actuator and the pusher is provided which consists of a pair of arms pivoted to each other at one end, the other end of a first of them being connected to the actuator and the other end of the second arm being connected to the pusher; a pivot is then preferably provided for the second arm which divides that arm into a length between pivot and pusher which is small compared to the length between pivot and the other end of the second arm. With this arrangement, mechanical pushing of the actuator moves the first arm linearly, thereby pivoting the second arm about its pivot and moving the pusher to effect connector disengagement, with a minimum of operator-applied force.

Also preferably provided to assure that the portable computer is moved into position on the expansion base exactly along the desired horizontal direction, there is provided an alignment pin mounted on the expansion base and extending horizontally forwardly toward a corresponding socket on the rear of the portable computer, to assure such alignment as will enable the pins of the connectors to be centered directly in the proper corresponding sockets of the other connector during assembly; also preferably provided are at least one spring-biased guide latch on each side of the path of travel of the portable computer as it is slid into position, these guide latches being urged inwardly into corresponding grooves on each side of the portable computer, thereby preventing substantial tilting or lifting of the portable computer as it is slid into position and also reducing the amount of lateral cocking of the portable computer which may occur due to clearance between the outside of the portable computer and the inside of the opening through which it is inserted.

The preferred embodiment of the invention therefore comprises an expansion base system which provides for superjacent support of an external monitor while enabling use of the tilt-up monitor of the portable computer when desired, provides low-force separation of the connector plug elements when it is desired to remove the portable computer from its position on the expansion base, and assures easy, precise alignment of the connector elements as the portable computer is slid into position to assure exact, easy, damage-free mating of the two connectors.

BRIEF DESCRIPTION OF FIGURES

The invention will be more readily understood from a consideration of the following detailed description, taken in connection with accompanying drawings, in which:

FIG. 7 is a fragmentary sectional view taken along line 7—7 of FIG. 3;

FIG. 8 is a fragmentary sectional view taken along line 8—8 of FIG. 7;

FIG. 12 is a fragmentary elevational view, partly in section, taken along lines 12—12 of FIG. 2;

FIG. 13 is an enlarged fragmentary sectional view taken along lines 13—13 of FIG. 2;

FIG. 14 is a view like that of FIG. 13, but with the laptop in a slightly different position; and FIG. 15 is a fragmentary sectional view taken along lines 15—15 of FIG. 14.

DETAILED DESCRIPTION OF PREFERRED EMBODIMENTS

Figure 1:
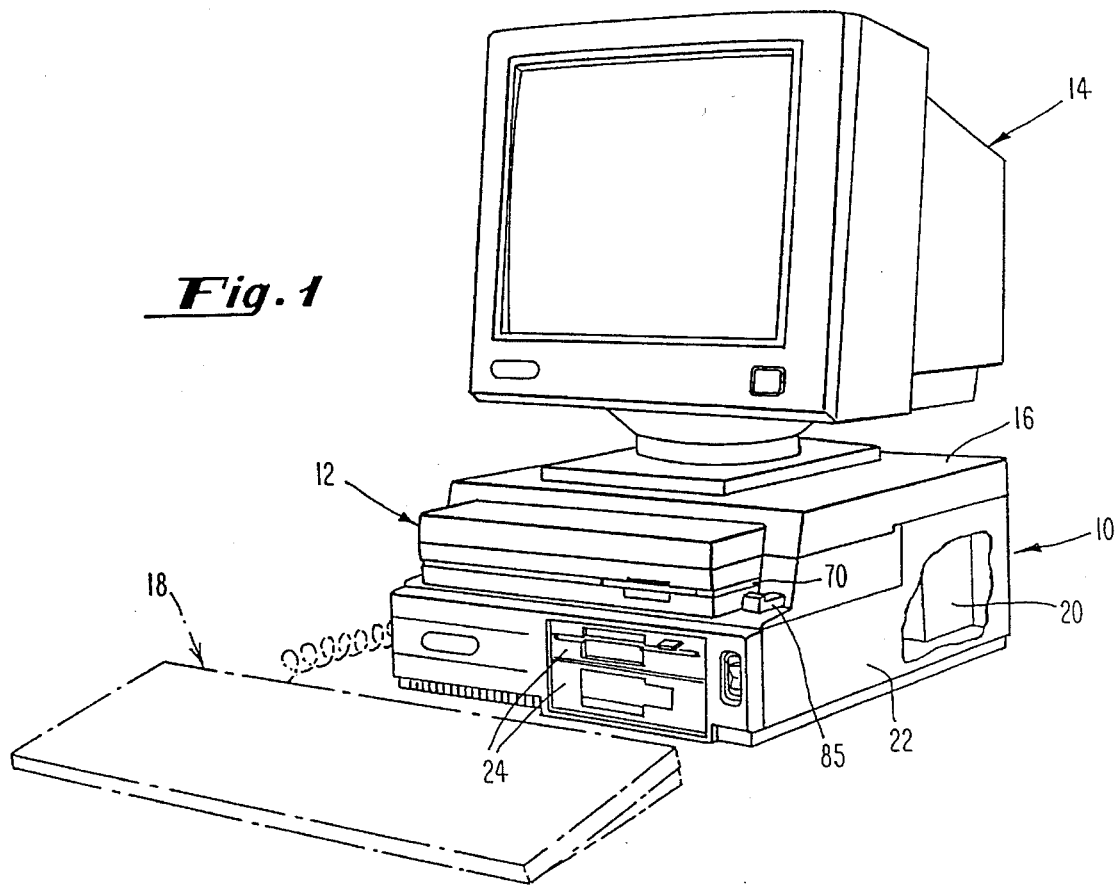
FIG. 1 is a perspective view of an assembly of a conventional portable computer, an expansion base according to a preferred embodiment of the present invention, a conventional keyboard and a conventional monitor.

Referring now to the preferred embodiment of the invention shown in the drawings by way of example only, and without thereby in any way limiting the scope of the invention, FIG. 1 shows a complete system comprising an expansion base 10 in accordance with the invention, with a laptop computer 12 mounted thereon, a computer monitor 14 resting on top of the cover portion 16 of the expansion base, and a standard alphanumeric keyboard 18 appropriately connected to the electronics within the base. Shown schematically is a compartment 20 within the base containing additional auxiliary equipment such as a DC converter to run the laptop computer, appropriate additional cards for the laptop computer and any other special modems or devices which it is desired to provide by way expansion of the capabilities of the laptop computer.

The expansion base 10 comprises an expansion base cabinet 22 containing the above-mentioned circuitry, as well as in this example providing for mounting of digital mass storage devices at 24 at the front face of the base cabinet. A cover or platform portion 16 of the expansion base overlies the top of the base cabinet and provides a horizontal flat surface upon which the monitor 14 rests, in normal desk operation of the system.

Figure 2:
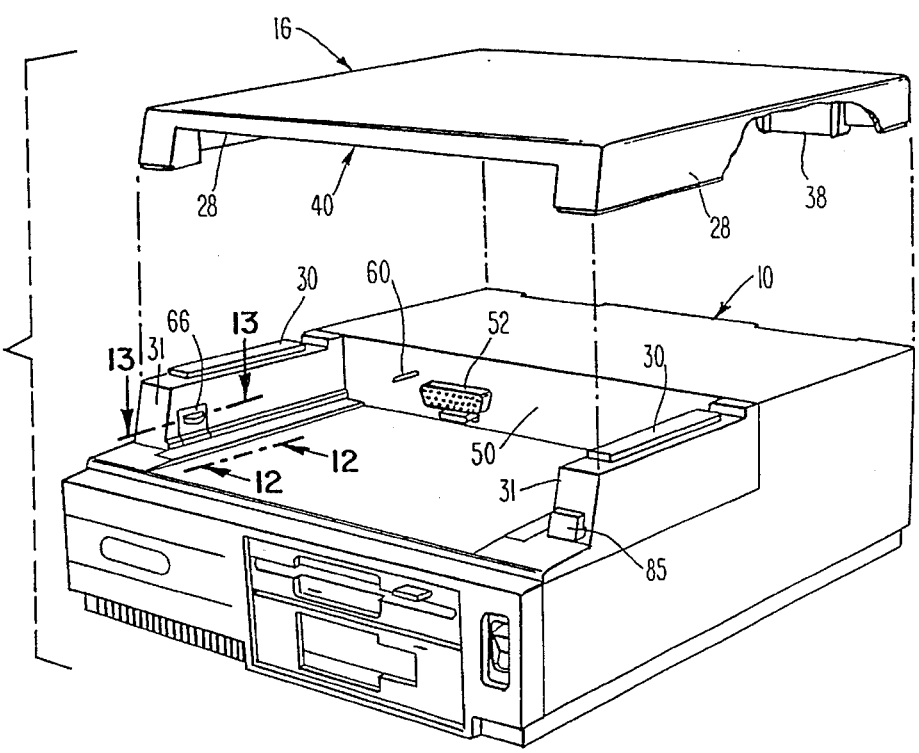
FIG. 2 is a perspective view of the expansion base, with the cover exploded upwardly.
Figure 4:
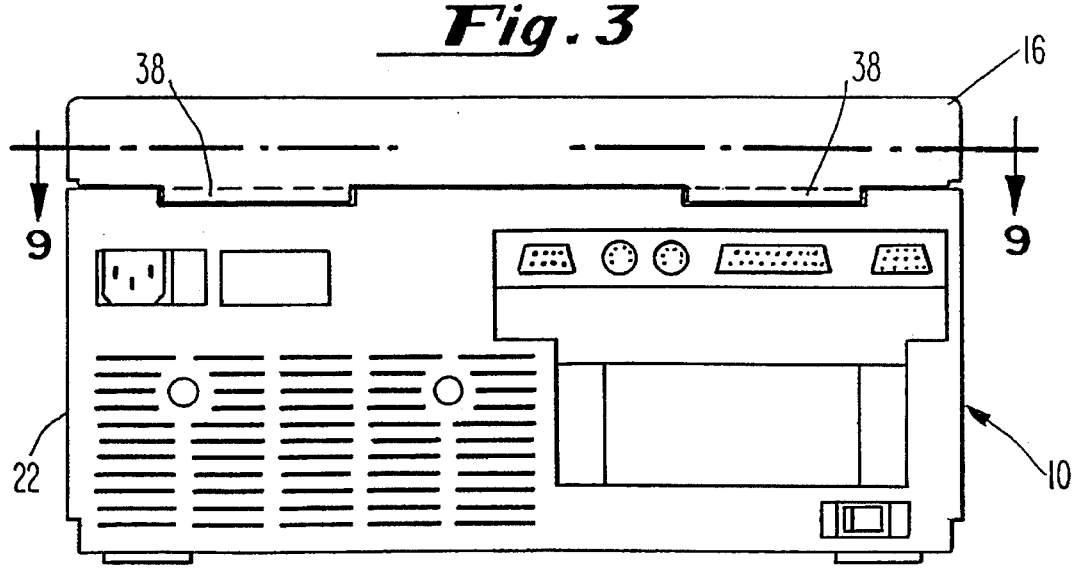
FIG. 4 is a rear elevational view of the expansion base of FIG. 3, with the cover in place.
Figure 9:
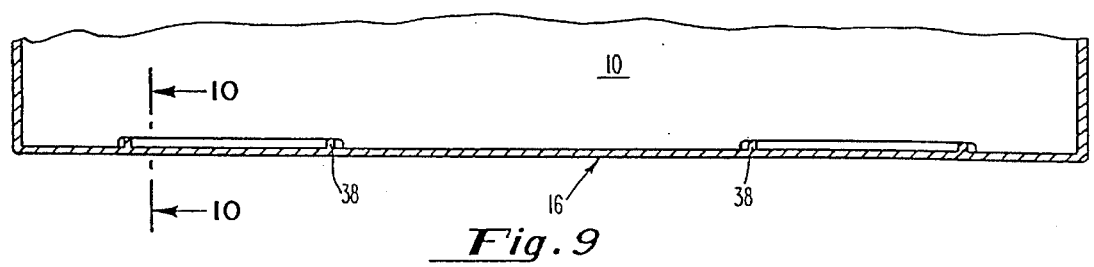
FIG. 9 is a fragmentary sectional view taken along lines 9—9 of FIG. 4.
Figure 10:
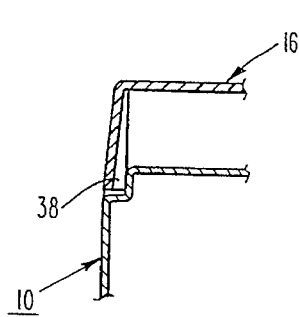
FIG. 10 is a fragmentary sectional view taken along lines 10—10 of FIG. 9.

As can be seen particularly clearly in FIGS. 1 and 2, the cover 16 has sidewalls 28 which rest upon upstanding shoulders 31 provided on each side and near the front of the top of the expansion base cabinet. The rear portion of the cover 16 rests upon the top of the enclosed rear portion of the base cabinet (see FIG. 4). Upstanding lands 30 atop each shoulder 31 position the cover against rearward and sideward motion by fitting within the ribbed openings 34 and 36 (see FIG. 5) at the sides and near the front of the cover. Forward motion of the cover when in place is prevented by the small tabs 38 (FIGS. 4 and 9) extending downwardly at the rear of the cover, which snap into position just behind and against the rear surface of the base cabinet.

The front wall of the cover 16 is apertured at 40 so as to permit the laptop computer 12 to slide through it when it is positioned on top of the base cabinet, and thus permit placement of the laptop in and out of position on top of the base cabinet without removal of the monitor 14 or cover 16, when so desired. However, the monitor and cover can be removed and the laptop placed in position on the base cabinet so that its top opening lid carrying its own display can be opened upwardly, when use of that display is desired.

Figure 5:
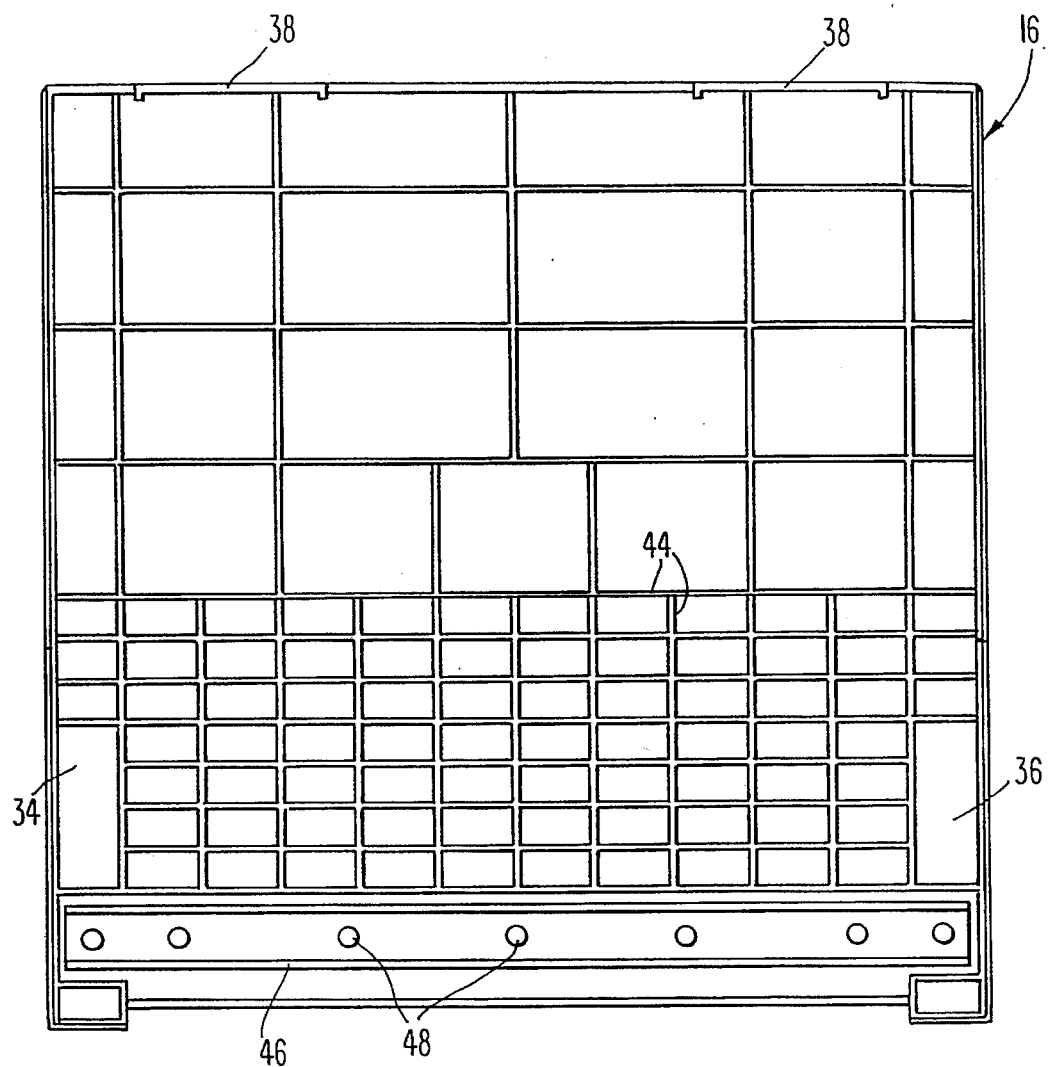
FIG. 5 is a bottom plan view of the cover, or monitor platform.
Figure 6:
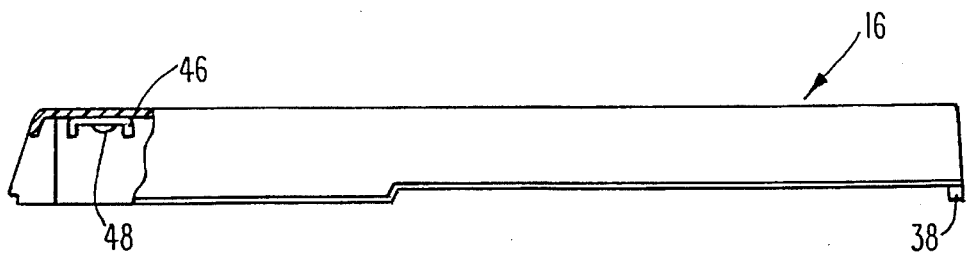
FIG. 6 is a side elevational view of the cover, with parts broken away.

As shown particularly in FIGS. 5 and 6, the cover 16, which may be primarily of a strong plastic material, preferably is made with strengthening ribs such as 44 of integral plastic material, and with a U-shaped metal strengthening channel 46 extending across the underside of the front of the cover adjacent the front opening, secured thereto by suitable fasteners such as 48, which may be in the nature of heat softenable plastic rivets. The cover is thereby made so as to withstand the considerable weight of the monitor 14 which is placed upon it.

Figure 16:
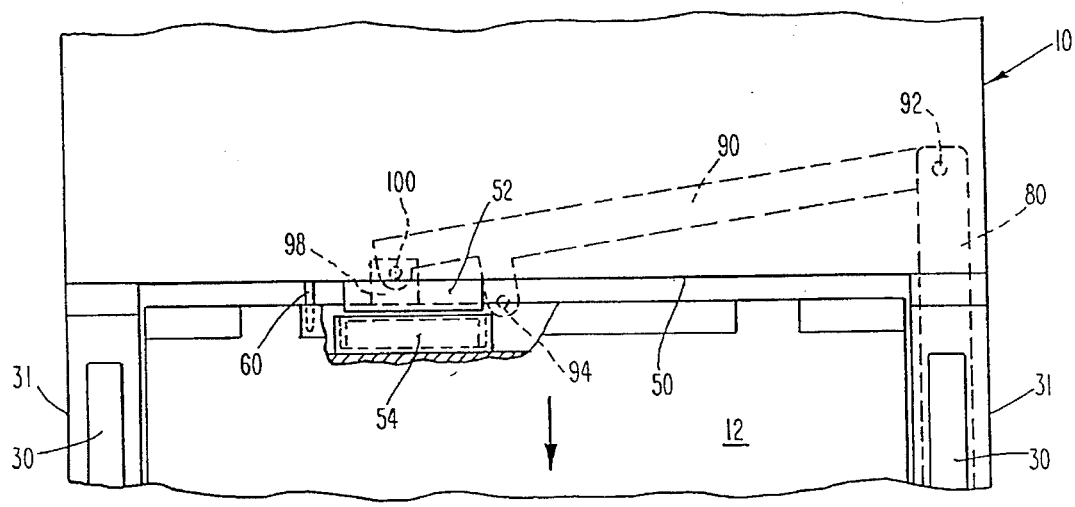
FIG. 16 is a fragmentary plan view showing a laptop computer having just been disconnected from the expansion base socket.

On a vertical wall 50 of the base cabinet facing the front thereof is a multipin socket 52 (Fig.2), which typically may have as many as about 200 sockets for connection to corresponding pins on the connector 54 at the back of the laptop computer (see FIG. 16). The laptop is installed by sliding it horizontally and rearwardly along the top of the base cabinet until the pins extending from connector 54 enter and mate with those of the wall-mounted connector 52. In this way the necessary electrical connections are provided between the laptop and the internal electronic components of the expansion base, such as the circuitry for replacing the battery supply in the laptop with rectified alternating current from a converter in the base cabinet, along with other appropriate power and signal leads.

Figure 11:
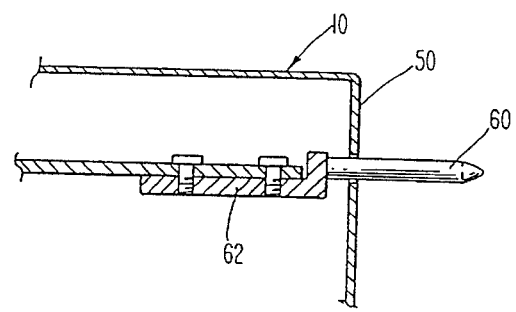
FIG. 11 is a fragmentary sectional view taken along lines 11—11 of FIG. 3.

To aid in assuring that the many-pinned connector 54 of the laptop computer mate with the connector elements of the base cabinet socket 52, an alignment pin 60 (FIGS. 3 and 11) is provided on the same rear wall as the socket 52, mounted preferably as shown in the Figures by attachment to a right-angle bracket 62 mounted on the base cabinet. The alignment pin 60 is directly aligned with a corresponding opening in the rear of the laptop computer, and is tapered at its forward end so that as the laptop is slid into position the alignment pin enters the aligning opening on the laptop computer and eases the computer into exactly the correct lateral position to accomplish the desired mating of the multipin, multisocket connectors.

In order to assure proper lateral positioning and to avoid cocking and undesired upward lifting of the laptop, side guide latches 66 and 68 are provided (FIGS. 2, 12 and 13–15), one on each side of the path along which the laptop slides as it assumes its position on the base cabinet. Grooves such as 70 are provided on each side of the laptop, and each guide latch is mounted on the inner face of one of the shoulders 31 of the base cabinet. Each latch comprises the actual guide member 72, which is slideably mounted on a track 74 for reciprocating motion laterally of the path of the laptop, and is spring-biased outwardly into the path of the laptop by the spiral spring 76. The guide is rounded at both forward and rearward edges to provide cam-like surfaces so that, as shown particularly in FIGS. 13 and 14, when the rearward side corner of the laptop first engages the rounded corner of the guide member 72, the latter will be urged inwardly against spring compression and will then slide in the groove 76 to provide the desired lateral guidance, and to prevent upward and downward motion of the laptop computer. Upon removal of the laptop, the spring again urges the latch member outwardly into position for the next operation. Since a latch is provided on each side of the path of the laptop computer, the computer is held against cocking motion or upright lifting of it, which might either jam the computer in its entrance way or damage the rear connector pins.

Figure 3:
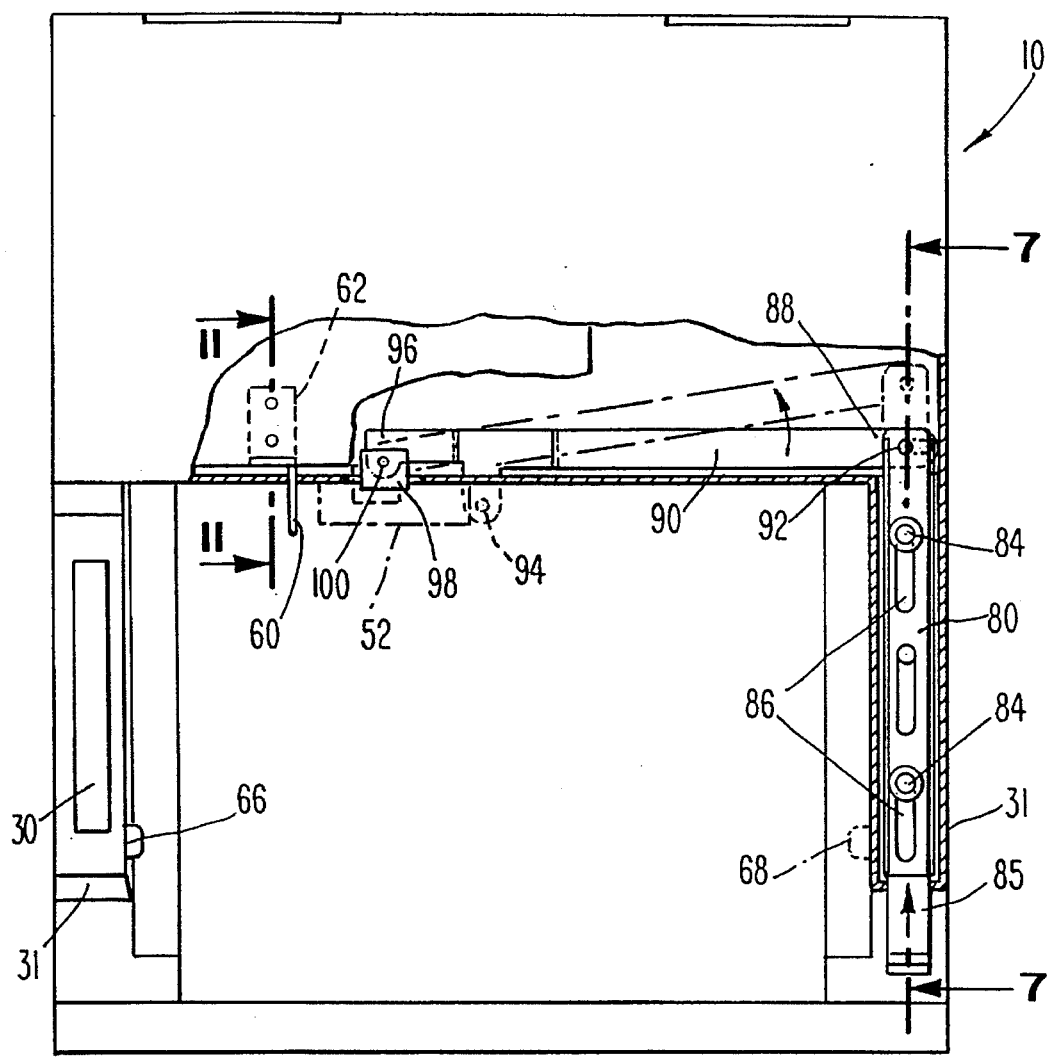
FIG. 3 is a top plan view of the expansion base of Fig. 2, with the cover removed and parts broken away.

FIGS. 3 and 7 show a preferred embodiment of an arrangement for enabling disconnection of the laptop computer from the rear connector when it is desired to remove the laptop computer. A first reciprocable arm 80 is mounted at one side of the base cabinet so as to be free to perform longitudinal sliding motion; to guide it, the vertical retainers 84 extend through longitudinally extending slots 86. The forward end of the arm 80 is directly connected to a manually reciprocal actuator 85 at the front of the base cabinet, to permit the operator to push the actuator and move the arm 80 rearwardly. One end 88 of a second arm 90 is pivoted to the rearward end of first arm 80 by the pivot pin 92, and the latter arm is also pivoted about pivot 94 extending vertically from the base cabinet.

Accordingly, when the operator moves the manual actuator 85 rearwardly, the arm 80 and the arm 88 move from the position shown in full line to those shown in broken line in FIG. 3. The pivot pin 94 is located at a position spaced from the distal end 96 of arm 90, but nearer thereto than to the pivot pin 92 joining the two arms. Accordingly, only a relatively small amount of force need be applied by the operator to the manual actuator to produce a substantial, multiplied rotational force at the distal end 96 of the arm 90.

The latter arm is directly connected to the pusher element 98 extending through the wall 50 of the base cabinet, just below the connector 52, in the region normally occupied by the rear of the laptop computer when it is installed. The latter pusher is secured to the distal end 96 of the arm 90 by a vertical pin 100 which permits the pusher to rotate freely through an angle, so that when the pusher element contacts the rear of the laptop computer, and arm 90 is rotated further, the face of the pusher will remain flat against the rear of the laptop computer, as desired. Thus, when it is desired to remove the laptop computer, the operator merely pushes rearwardly the manual actuator 85, which causes the pusher element 98 to be-urged against the rear of the laptop-computer with multiplied force, thus forcing disconnection of the laptop computer mounted connector from the expansion-base mounted connector, while requiring only relatively low force from the operator.

There has therefore been provided an expansion base system which provides for support of an external monitor, while enabling use of the tilt-up monitor of the computer itself when desired, which provides for separation of the connection elements of the laptop computer connector and of the expansion base connector by the application of only small forces by the operator, and which assures easy, precise alignment of the connector elements as the laptop computer is Slid into position on the expansion base thereby to assure exact, easy, damage-free mating of the two connectors.

While the invention has been described with particular reference to specific embodiments, in the interest of complete definiteness, it will be understood that it may be embodied in a variety of forms diverse from those specifically shown and described, without departing form the spirit and scope of the invention.

What is claimed is:

1. An expansion system for a portable computer, wherein said computer comprises a cabinet structure and computer electronics in said cabinet structure, said expansion system comprising in combination therewith:

an auxiliary base cabinet for receiving said portable computer in a rest position and containing auxiliary electrical apparatus for connection to said computer electronics, said auxiliary base including means for applying a separating force between said portable computer and the auxiliary base cabinet, said force applying means including a remote, manually operable actuator;

a monitor-support for supporting a computer monitor on the top thereof, said monitor-support being supported by said base cabinet, wherein said base cabinet structure comprises an upper peripheral portion and said monitor-support structure comprises a removable cover having a flat upper panel portion and a depending peripheral portion supported by the base cabinet structure, the lower end of said peripheral portion of said monitor-support structure and the upper peripheral portion of said expansion base cabinet comprising mutually interlocking means to secure said cover against horizontal motion once in place on said expansion base cabinet.

2. The system of claim 1, wherein said monitor-support structure is positioned to permit said portable computer to be slid horizontally into position on said expansion base cabinet directly below the flat upper panel portion of said monitor-support structure.

3. An expansion system for a portable computer, wherein said computer comprises a cabinet structure and computer electronics in said cabinet structure, said expansion system comprising in combination therewith:

an auxiliary base cabinet for receiving said portable computer in a rest position and containing auxiliary electrical apparatus for connection to said computer electronics, said auxiliary base including means for applying a separating force between said portable computer and the auxiliary base cabinet, said force applying means including a remote, manually operable actuator;

a monitor-support for supporting a computer monitor on the top thereof, said monitor-support being supported by said base cabinet;

guide latches, one on each side of the interior of said expansion base cabinet; and a pair of grooves, one in each outer side of said portable computer and in which said guide latches slide when said portable computer is slid in or out of position on said expansion base cabinet, each of said latches being spring-biased inwardly toward the groove in which it slides.

4. An expansion system for a portable computer, wherein said computer comprises a cabinet structure, a tilt-up display lid and computer electronics in said cabinet structure, said expansion system comprising in combination therewith:

an auxiliary base cabinet for receiving said portable computer in a rest position and containing auxiliary electrical apparatus for connection to said computer electronics; and a monitor-support for supporting a computer monitor on the top thereof and comprising a platform extending horizontally across and above the rest position of said portable computer, said monitor-support being keyed to a portion of the base cabinet for inhibiting relative horizontal motion between the monitor-support and the base cabinet.

5. The system of claim 4, wherein:

said base cabinet structure comprises an upper peripheral portion and said monitor-support structure comprises a removable cover having a flat upper panel portion and a depending peripheral portion supported by the base cabinet structure, the lower end of said peripheral portion of said monitor-support structure and the upper peripheral portion of said expansion base cabinet comprising mutually interlocking means to secure said cover against horizontal motion once in place on said expansion base cabinet.

6. The system of claim 5, wherein said monitor-support structure is positioned to permit said portable computer to be slid horizontally into position on said expansion base cabinet directly below the flat upper portion of said monitor-support structure.

7. The system of claim 4, comprising an expansion base connector mounted on said expansion base cabinet and facing and aligned with a corresponding connector on the rear of said portable computer so that as said portable computer is slid rearwardly along the top of said expansion base cabinet, said expansion base connector and said portable computer connector can be accurately mated; and manually actuatable means for sliding said portable computer forwardly to release said portable computer connector from said expansion base connector, said manually controllable means comprising a pusher element positioned between the rear of said portable computer and an upstanding portion of said expansion base and movable along the direction such as to push said portable computer connector free of said expansion base connector; and a manually operable actuator connected to, but remote from, said pusher element and actuatable to move said pusher element by application to said actuator of a force small compared with that required to be applied to said portable computer by said pusher element to accomplish said freeing of said portable computer and expansion base connectors from each other.

8. The system of claim 7, wherein said actuator is coupled to said pusher element by a linkage system comprising a first arm and a second arm, one end of said first arm being pivotably connected to one end of said second arm, the other end of said first arm being coupled to said actuator for reciprocating motion in response to manual operation of said actuator, the other end of said second arm being pivotably coupled to said pusher element, and pivot means pivotably mounting said second arm to said expansion base cabinet at a position along said second arm such that the length of said second arm between said pivot means and said one end of said first arm is substantially greater than the length of said second arm between said pivot means and said other end of said second arm.

9. The system of claim 4 further comprising a guide pin mounted on said expansion base cabinet and extending forwardly and horizontally within said expansion base cabinet, and a corresponding socket aligned therewith on the rear of said portable computer and positioned so that when said pin slides into said socket, said portable computer and said expansion base connectors are properly aligned for mating with each other.

10. The system of claim 4 further comprising guide latches, one on each side of the interior of said expansion base cabinet, and a pair of grooves, one in each outer side of said portable computer and in which said guide latches slide when said portable computer is slid in or out of position on said expansion base cabinet, each of said latches being spring-biased inwardly toward the groove in which it slides.

11. An expansion system for a portable computer, wherein said computer comprises a cabinet structure, a tilt-up display lid and computer electronics in said cabinet structure, said expansion system comprising in combination therewith:

an auxiliary base cabinet for receiving said portable computer in a rest position and containing auxiliary electrical apparatus for connection to said computer electronics; and a monitor-support removably associated with said base cabinet for supporting a computer monitor on the top thereof, said monitor-support being supported by said base cabinet and comprising a platform extending horizontally across and above the rest position of said portable computer.

12. An expansion system for a portable computer, wherein said computer comprises a cabinet structure, a tilt-up display lid and computer electronics in said cabinet structure, said expansion system comprising in combination therewith:

an auxiliary base cabinet for receiving said portable computer in a rest position and containing auxiliary electrical apparatus for connection to said computer electronics; and a monitor-support for supporting a computer monitor on the top thereof said monitor-support comprising a platform extending horizontally across and above the rest position of said portable computer and being removably supported by at least a portion of said base cabinet such that the use of said tilt-up display is enabled when said monitor-support is removed.

13. The system of claim 12 wherein said monitor-support is keyed to a portion of the base cabinet for inhibiting relative horizontal motion between the monitor-support and the base cabinet.

* * * * *